(12) United States Patent
Jia

(10) Patent No.: US 12,032,411 B2
(45) Date of Patent: Jul. 9, 2024

(54) FOLDABLE DISPLAY SCREEN

(71) Applicant: WUHAN CHINA STAR OPTOELECTRONICS SEMICONDUCTOR DISPLAY TECHNOLOGY CO., LTD., Wuhan (CN)

(72) Inventor: Chengjie Jia, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 401 days.

(21) Appl. No.: 17/267,774

(22) PCT Filed: Oct. 9, 2020

(86) PCT No.: PCT/CN2020/120005
§ 371 (c)(1),
(2) Date: Feb. 10, 2021

(87) PCT Pub. No.: WO2022/041404
PCT Pub. Date: Mar. 3, 2022

(65) Prior Publication Data
US 2022/0308630 A1    Sep. 29, 2022

(30) Foreign Application Priority Data
Aug. 31, 2020  (CN) .......................... 202010896222.1

(51) Int. Cl.
*G06F 1/16*       (2006.01)
*G09F 9/30*       (2006.01)

(52) U.S. Cl.
CPC .......... *G06F 1/1652* (2013.01); *G06F 1/1641* (2013.01); *G06F 1/1616* (2013.01); *G06F 1/1656* (2013.01); *G09F 9/301* (2013.01)

(58) Field of Classification Search
CPC .... G06F 1/1616; G06F 1/1641; G06F 1/1652; G06F 1/1656
See application file for complete search history.

(56) References Cited

U.S. PATENT DOCUMENTS

2003/0218577 A1*  11/2003  Wang .................... G06F 1/1616
                                                                345/1.3
2011/0102976 A1*  5/2011  Chen ..................... G06F 1/1652
                                                                361/679.01

(Continued)

FOREIGN PATENT DOCUMENTS

CN       102855821 A      1/2013
CN       103376572 A     10/2013

(Continued)

OTHER PUBLICATIONS

International Search Report in International application No. PCT/CN2020/120005, mailed on May 27, 2021.

(Continued)

*Primary Examiner* — Rockshana D Chowdhury
*Assistant Examiner* — Martin Antonio Asmat Uceda
(74) *Attorney, Agent, or Firm* — PV IP PC; Wei Te Chung; Zhigang Ma

(57)    ABSTRACT

A foldable display screen is disclosed. The foldable display screen includes a first substrate and a second substrate spliced to form a complete substrate; a flexible display screen having a first display area on front surfaces of the first substrate and the second substrate, a second display area on a back surface of the second substrate, and a side-surface bending display area between the first display area and the (Continued)

second display area; and a transparent protective structure covering the side-surface bending display area.

4 Claims, 3 Drawing Sheets

(56) References Cited

U.S. PATENT DOCUMENTS

| | | | |
|---|---|---|---|
| 2015/0229844 | A1 | 8/2015 | Yamazaki et al. |
| 2017/0010634 | A1* | 1/2017 | Ahn ................... H04M 1/0216 |
| 2020/0205251 | A1 | 6/2020 | Ka |
| 2021/0208636 | A1* | 7/2021 | Kim ..................... B32B 27/308 |

FOREIGN PATENT DOCUMENTS

| | | |
|---|---|---|
| CN | 104680940 A | 6/2015 |
| CN | 105874525 A | 8/2016 |
| CN | 106292023 A | 1/2017 |
| CN | 107065302 A | 8/2017 |
| CN | 207586882 U | 7/2018 |
| CN | 210925299 U | 7/2020 |
| JP | 2009064656 A | 3/2009 |
| WO | 2019111594 A1 | 6/2019 |

OTHER PUBLICATIONS

Written Opinion of the International Search Authority in International application No. PCT/CN2020/120005, mailed on May 27, 2021.

Chinese Office Action issued in corresponding Chinese Patent Application No. 202010896222.1 dated Mar. 25, 2021, pp. 1-8.

* cited by examiner

FOLDABLE DISPLAY SCREEN

RELATED APPLICATIONS

This application is a Notional Phase of PCT Patent Application No. PCT/CN2020/120005 having international filing date of Oct. 9, 2020, which claims the benefit of priority of Chinese Patent Application Nos. 202010896222.1 filed on Aug. 31, 2020. The contents of the above applications are all incorporated by reference as if fully set forth herein in their entirety.

FIELD OF INVENTION

The present disclosure relates to the field of display panels, and more particularly, to a foldable display screen.

BACKGROUND OF INVENTION

At present, surfaces of flexible display screens are fragile, and screens exposed outside when mobile phones are folded outward are easily damaged after coming in contact with a hard object or falling, which causes problems of inability to display or dark spots in a large area.

Referring to FIGS. 1a and 1b, FIG. 1a is a schematic front-view structural diagram of a foldable display screen in current technology, and FIG. 1b is a schematic cross-sectional structural diagram of the foldable display screen in current technology. The foldable display screen 100 includes a first substrate 10, a second substrate 20, and a flexible display screen 30, and the first substrate 10 and the second substrate 20 are spliced to form a complete substrate. The flexible display screen 30 is disposed on front surfaces of the first substrate 10 and the second substrate 20 and bent to a back surface of the second substrate 20 from the front surface of the second substrate 20. The flexible display screen 30 has a first display area 31 on the front surfaces of the first substrate 10 and the second substrate 20, a second display area 32 on the back surface of the second substrate 20, and a side-surface bending display area 33 between the first display area 31 and the second display area 32.

The side-surface bending display area 33 is easily damaged after coming in contact with a hard object or falling, which causes inability to display or dark spots in a large area.

Therefore, a new type of foldable display screen is needed to solve the defect in current technology.

Technical problem: an objective of the present disclosure is to provide a foldable display screen to solve problems of screens of flexible mobile phones exposed to sides being easily damaged after coming in contact with a hard object or falling.

SUMMARY OF INVENTION

In order to realize the above objective, the present disclosure provides a foldable display screen, which includes: a first substrate and a second substrate spliced to form a complete substrate; a flexible display screen disposed on front surfaces of the first substrate and the second substrate and bent to a back surface of the second substrate from the front surface of the second substrate, wherein the flexible display screen has a first display area on the front surfaces of the first substrate and the second substrate, a second display area on the back surface of the second substrate, and a side-surface bending display area between the first display area and the second display area; and a transparent protective structure covering the side-surface bending display area.

Disposing the transparent protective structure outside the side-surface bending display area can realize a protection effect in the side-surface bending display area without affecting display effect, which effectively relieves problems of screens that are easily damaged after coming in contact with a hard object or falling, and realizes the objective of effectively solving damages of sided flexible display screens.

Further, in other embodiments, the flexible display screen further includes a first frame configured to cover sides of the first substrate and sides of the second substrate excluding the side-surface bending display area. Both ends of the transparent protective structure are fixedly connected to the first frame respectively, and the first frame and the transparent protective structure form a whole frame.

Further, in other embodiments, the foldable display screen also includes a polarizer, the first frame has two first connecting ends, the transparent protective structure has two second connecting ends, and the first connecting ends and the second connecting ends are joint to each other.

Further, in other embodiments, each of the first connecting ends has a plurality of slots, each of the second connecting ends has a plurality of joint terminals matching the plurality of slots, and each of the plurality of joint terminals joints into a corresponding one of the plurality of slots.

Further, in other embodiments, the slot has a notch, the joint terminal has an elastic bolt, the elastic bolt joints into the slot, and the notch stops the elastic bolt.

Further, in other embodiments, each of the second connecting ends is provided with at least one through-hole filled with a flexible adhesive to bond the second connecting ends and the first connecting ends together.

Further, in other embodiments, contact surfaces between the first connecting ends and the second connecting ends are provided with a buffer layer.

Further, in other embodiments, the transparent protective structure further includes a main part covering the side-surface bending display area; and a plurality of arc parts covering corners of the side-surface bending display area, wherein one end of each of the arc parts is connected to the main part, and each of the second connecting ends is connected to another end of each of the arc parts.

Further, in other embodiments, the transparent protective structure is "]" shaped, and the transparent protective structure is transparent glass or other transparent material.

Further, in other embodiments, the first substrate and the second substrate can be relatively bent around a junction thereof, and the first display area of the flexible display screen is provided with a bendable area corresponding to a bend of the first substrate and the second substrate.

Further, in other embodiments, the foldable display screen also includes a flexible and bendable element connecting the first substrate and the second substrate and configured to fold a first display surface.

Further, in other embodiments, sizes of the first substrate and the second substrate are same, the first display surface has a folding line overlapping a gap between the first substrate and the second substrate, and when the first display surface is folded, the first substrate and the second substrate are fully aligned to each other.

Further, in other embodiments, the first substrate further includes a substrate layer, a thin film transistor layer disposed on the substrate layer, a planarization layer disposed on the thin film transistor layer, a pixel definition layer disposed on the planarization layer, and a thin film encapsulation layer disposed on the pixel definition layer.

Further, in other embodiments, the foldable display screen also includes a camera disposed on a back surface of the first substrate.

Beneficial effect: compared to current technology, beneficial effects of the present disclosure is that the foldable display screen provided by the present disclosure disposes the transparent protective structure outside the side-surface bending display area, which can realize a protection effect in the side-surface bending display area without affecting display effect, effectively relieves problems of screens that are easily damaged after coming in contact with a hard object or falling, and realizes the objective of effectively solving damages of sided flexible display screens.

DESCRIPTION OF DRAWINGS

The following detailed description of specific embodiments of the present disclosure will make the technical solutions and other beneficial effects of the present disclosure obvious with reference to the accompanying drawings.

Figure 1A:
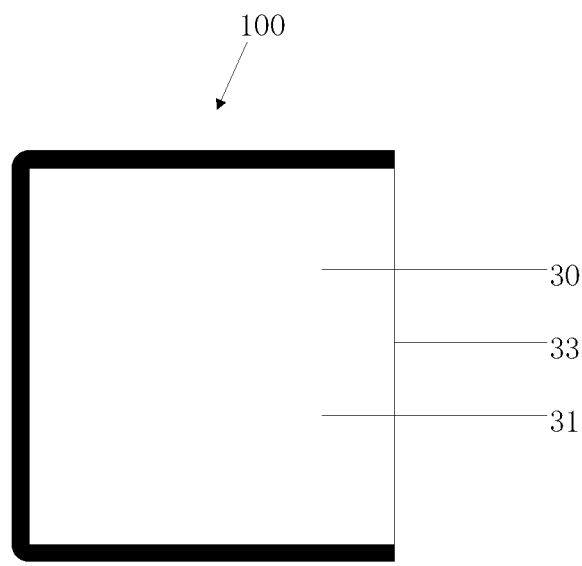
FIG. 1a is a schematic front-view structural diagram of a foldable display screen in current technology.
Figure 1B:
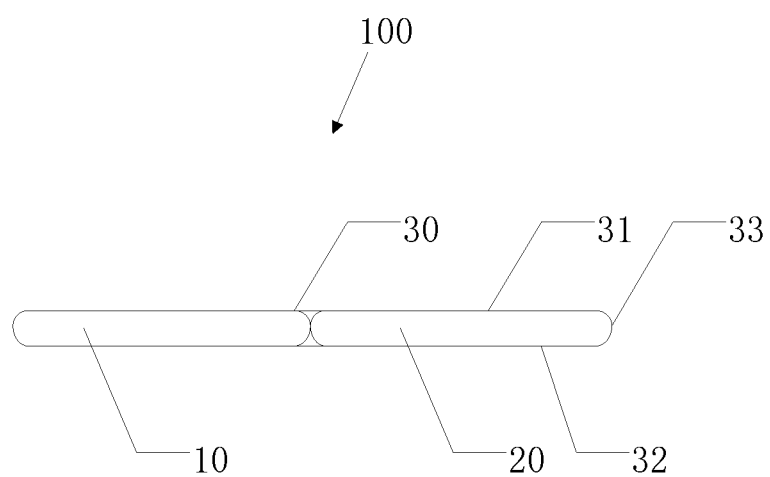
FIG. 1b is a schematic cross-sectional structural diagram of the foldable display screen in current technology.

Elements in the drawings for current technology are designated by reference numerals listed below.
100. foldable display screen;
10. first substrate; 20. second substrate;
30. flexible display screen; 31. first display area;
32. second display area; 33. side-surface bending display area.

Elements in the drawings for the embodiments of the present disclosure are designated by reference numerals listed below.
100. foldable display screen;
10. first substrate; 20. second substrate;
30. flexible display screen; 31. first display area;
32. second display area; 33. side-surface bending display area;
40. transparent protective structure; 50. first frame;
51. first connecting end; 41. second connecting end;
511. slot; 411. joint terminal;
412. through-hole; 42. main part;
43. arc part.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The following description provides many different embodiments or examples for implementing different structures of the present disclosure. In order to simplify the present disclosure, the components and settings of a specific example are described below. Of course, they are merely examples and are not intended to limit the present disclosure. In addition, the present disclosure may repeat reference numerals and/or reference letters in different examples, which are for the purpose of simplicity and clarity, and do not indicate the relationship between the various embodiments and/or arrangements discussed. In addition, the present disclosure provides examples of various specific processes and materials, but one of ordinary skill in the art will recognize the use of other processes and/or the use of other materials.

Figure 2:
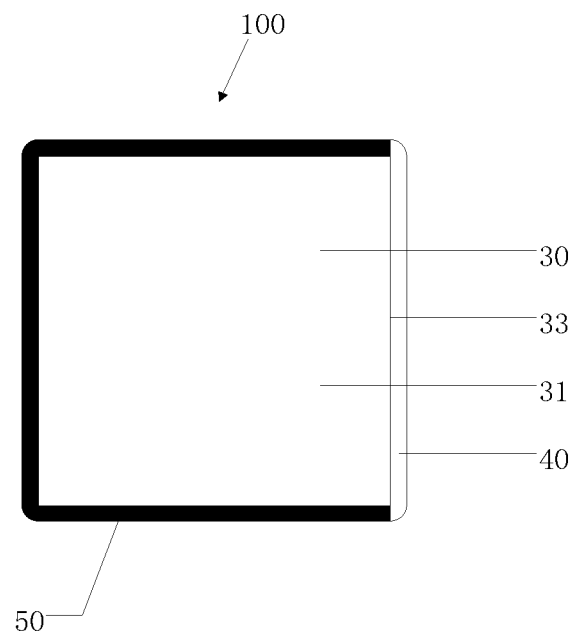
FIG. 2 is a schematic front-view structural diagram of a foldable display screen according to an embodiment of the present disclosure.
Figure 3:
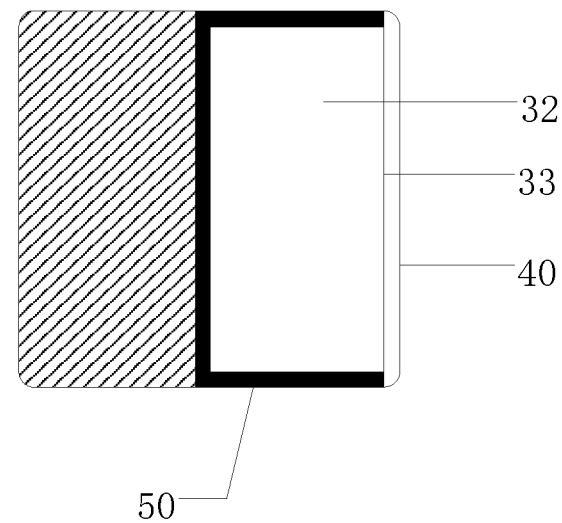
FIG. 3 is a schematic rear-view structural diagram of the foldable display screen according to an embodiment of the present disclosure.
Figure 4:
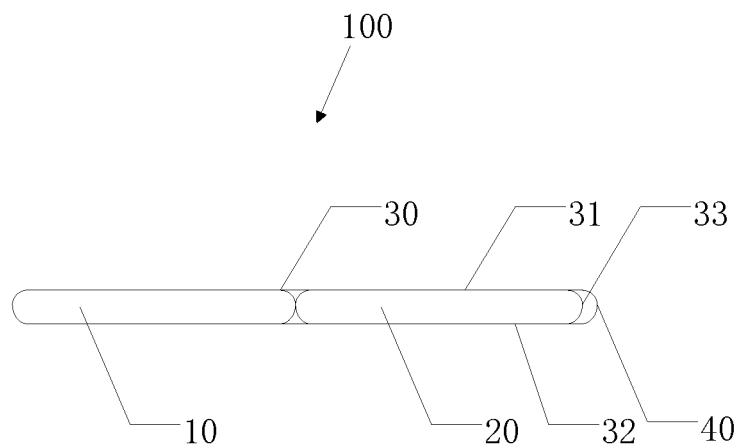
FIG. 4 is a schematic cross-sectional structural diagram of the foldable display screen according to an embodiment of the present disclosure.

The present disclosure provides a foldable display screen 100. Referring to FIGS. 2 to 4, FIG. 2 is a schematic front-view structural diagram of the foldable display screen according to an embodiment of the present disclosure, FIG. 3 is a schematic rear-view structural diagram of the foldable display screen according to an embodiment of the present disclosure, and FIG. 4 is a schematic cross-sectional structural diagram of the foldable display screen according to an embodiment of the present disclosure. The foldable display screen 100 includes a first substrate 10, a second substrate 20, a flexible display screen 30, a transparent protective structure 40, and a first frame 50.

The first substrate 10 and the second substrate 20 are spliced to form a complete substrate. The flexible display screen 30 is disposed on front surfaces of the first substrate 10 and the second substrate 20 and bent to a back surface of the second substrate 20 from the front surface of the second substrate 20.

The flexible display screen 30 has a first display area 31 on the front surfaces of the first substrate 10 and the second substrate 20, a second display area 32 on the back surface of the second substrate 20, and a side-surface bending display area 33 between the first display area 31 and the second display area 32.

The first frame 50 is configured to cover sides of the first substrate 10 and sides of the second substrate 20 excluding the side-surface bending display area 33.

The transparent protective structure 40 covers the side-surface bending display area 33. Disposing the transparent protective structure 40 outside the side-surface bending display area 33 can realize a protection effect in the side-surface bending display area 33 without affecting display effect, which effectively relieves problems of screens that are easily damaged after coming in contact with a hard object or falling, and realizes the objective of effectively solving damages of sided flexible display screens 30.

Figure 5:
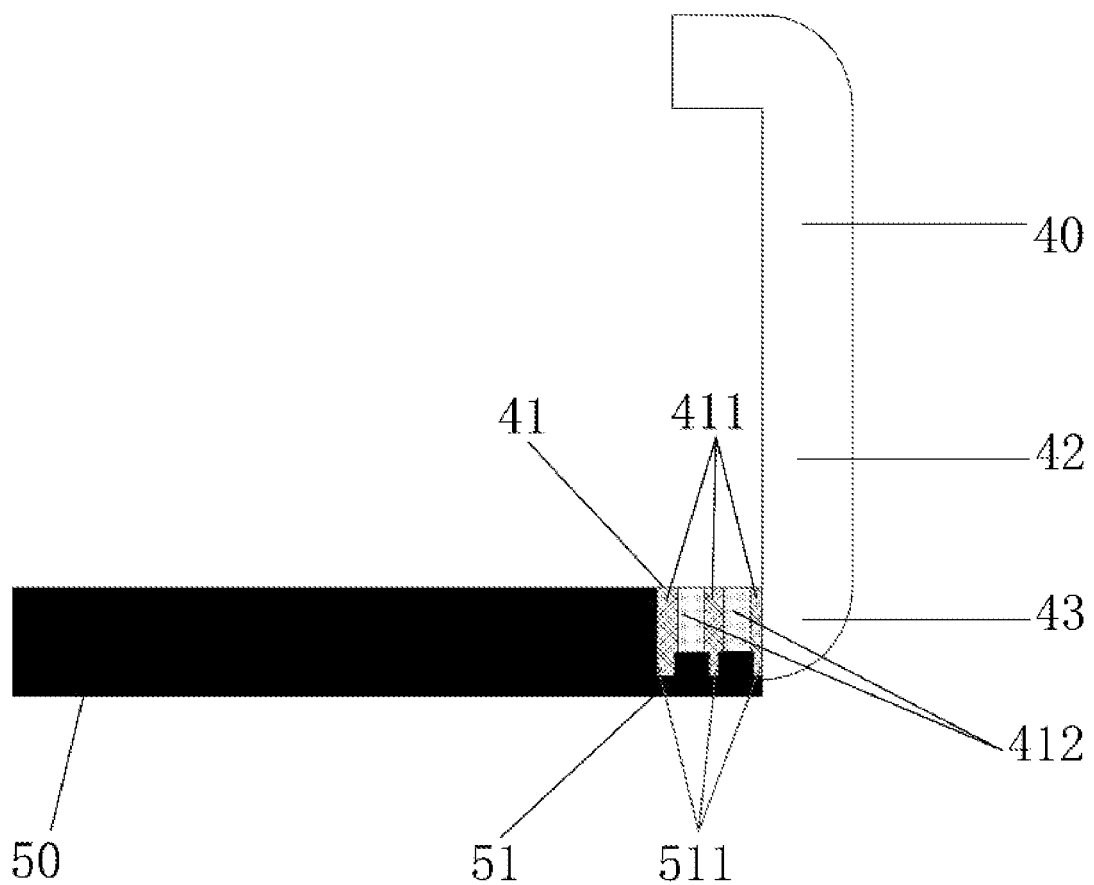
FIG. 5 is a schematic structural diagram of a first frame and a transparent protective structure of the foldable display screen according to an embodiment of the present disclosure.

Referring to FIG. 5, FIG. 5 is a schematic structural diagram of the first frame and the transparent protective structure of the foldable display screen according to an embodiment of the present disclosure. Both ends of the transparent protective structure 40 are fixedly connected to the first frame 50 respectively, and the first frame 50 and the transparent protective structure 40 form a whole frame.

The first frame 50 has two first connecting ends 51, the transparent protective structure 40 has two second connecting ends 41, and the first connecting ends 51 and the second connecting ends 41 are joint to each other.

Each of the first connecting ends 51 has a plurality of slots 511, each of the second connecting ends 41 has a plurality of joint terminals 411 matching the plurality of slots 511, and each of the plurality of joint terminals 411 joints into a corresponding one of the plurality of slots 511.

Each of the plurality of slots 511 has a notch, each of plurality of joint terminals 411 has an elastic bolt, the elastic bolt joints into the slot 511, and the notch stops the elastic bolt.

Each of the second connecting ends 41 is provided with at least one through-hole 412 filled with a flexible adhesive to bond the second connecting ends 41 and the first connecting ends 51 together.

In other embodiments, contact surfaces between the first connecting ends 51 and the second connecting ends 41 are provided with a buffer layer, which can reduce a buffering force of the transparent protective structure 40 during assembly and in normal use.

The transparent protective structure 40 includes a main part 42 covering the side-surface bending display area 33; and a plurality of arc parts 43 covering corners of the side-surface bending display area 33, wherein one end of each of the arc parts is connected to the main part 42, and each of the second connecting ends 41 is connected to another end of each of the arc parts 43.

Wherein, the transparent protective structure 40 is "]" shaped, and the transparent protective structure 40 is transparent glass or other transparent material.

The first substrate 10 and the second substrate 20 can be relatively bent around a junction thereof, and the first display area 31 of the flexible display screen 30 is provided with a bendable area corresponding to a bend of the first substrate 10 and the second substrate 20.

The foldable display screen 100 also includes a flexible and bendable element connecting the first substrate 10 and the second substrate 20 and configured to fold a first display surface.

Sizes of the first substrate 10 and the second substrate 20 are same, the first display surface has a folding line overlapping a gap between the first substrate 10 and the second substrate 20, and when the first display surface is folded, the first substrate 10 and the second substrate 20 are fully aligned to each other.

The first substrate 10 and the second substrate 20 also include a substrate layer, a thin film transistor layer disposed on the substrate layer, a planarization layer disposed on the thin film transistor layer, a pixel definition layer disposed on the planarization layer, and a thin film encapsulation layer disposed on the pixel definition layer.

In other embodiments, the foldable display screen 100 also includes a camera disposed on a back surface of the first substrate 10.

Beneficial effects of the present disclosure is that the foldable display screen 100 provided by the present disclosure disposes the transparent protective structure 40 outside the side-surface bending display area 33, which can realize a protection effect in the side-surface bending display area 33 without affecting display effect, effectively relieves problems of screens that are easily damaged after coming in contact with a hard object or falling, and realizes the objective of effectively solving damages of the sided flexible display screens 30.

In the above embodiments, the description of each embodiment has its own emphasis. For the parts that are not described in detail in an embodiment, can refer to the detailed description of other embodiments above.

The foldable display screen provided by the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A foldable display screen, comprising:
a first substrate and a second substrate spliced to form a complete substrate;
a flexible display screen disposed on front surfaces of the first substrate and the second substrate and bent to a whole back surface of the second substrate from the front surface of the second substrate, wherein the flexible display screen has a first display area on the front surfaces of the first substrate and the second substrate, a second display area on the whole back surface of the second substrate, and a side-surface bending display area between the first display area and the second display area;
a first frame configured to cover sides of the first substrate and sides of the second substrate excluding the side-surface bending display area, the first frame has two first connecting ends; and
a transparent protective structure covering the side-surface bending display area,
wherein the transparent protective structure comprises a main part covering the side-surface bending display area, two arc parts covering corners of the side-surface bending display area, and two second connecting ends; each of the two arc parts is connected between the main part and each of the second connecting ends, and is curved smoothly from the main part toward the second connecting end;
wherein each of the first connecting ends has a plurality of slots, the second connecting end has a plurality of joint terminals, and each of plurality of the joint terminals joints into a corresponding one of the plurality of slots; wherein the plurality of joint terminals is spaced by a plurality of through-holes, and the plurality of through-holes is filled with flexible adhesive to bond the plurality of joint terminals together, and to bond the second connecting end and the first connecting end together.

2. The foldable display screen according to claim 1, wherein contact surfaces between the first connecting ends and the second connecting ends are provided with a buffer layer.

3. The foldable display screen according to claim 1, wherein the transparent protective structure is transparent glass.

4. The foldable display screen according to claim 1, wherein the first substrate and the second substrate can be relatively bent around a junction of them, and the first display area of the flexible display screen is provided with a bendable area corresponding to a bend of the first substrate and the second substrate.

* * * * *